(12) United States Patent
Kuo et al.

(10) Patent No.: US 7,421,480 B2
(45) Date of Patent: Sep. 2, 2008

(54) PERSONAL COMPUTING ENVIRONMENT USING MOZILLA

(75) Inventors: Chih Jen Kuo, Milpitas, CA (US); Wei Luo, Sunnyvale, CA (US)

(73) Assignee: O2 Micro International Limited, Grand Cayman (KY)

( * ) Notice: Subject to any disclaimer, the term of this patent is extended or adjusted under 35 U.S.C. 154(b) by 849 days.

(21) Appl. No.: 10/837,310

(22) Filed: Apr. 29, 2004

(65) Prior Publication Data

US 2004/0205357 A1 Oct. 14, 2004

Related U.S. Application Data

(63) Continuation-in-part of application No. 09/796,847, filed on Feb. 28, 2001.

(60) Provisional application No. 60/466,611, filed on Apr. 30, 2003, provisional application No. 60/185,276, filed on Feb. 28, 2000, provisional application No. 60/185,278, filed on Feb. 28, 2000.

(51) Int. Cl.
*G06F 15/16* (2006.01)

(52) U.S. Cl. ...................................... 709/217

(58) Field of Classification Search .................. 709/217, 709/219; 707/1, 100
See application file for complete search history.

(56) References Cited

U.S. PATENT DOCUMENTS

| | | | |
|---|---|---|---|
| 4,885,778 A | 12/1989 | Weiss | |
| 5,146,499 A | 9/1992 | Geffrotin | |
| 5,944,794 A | 8/1999 | Okamoto et al. | |
| 5,983,273 A | 11/1999 | White et al. | |
| 5,995,965 A | 11/1999 | Experton | |
| 6,038,551 A | 3/2000 | Barlow et al. | |

(Continued)

FOREIGN PATENT DOCUMENTS

GB 2 324 395 A 10/1998

(Continued)

OTHER PUBLICATIONS

International Searching Authority, "Notification of Transmittal of the International Search Report and the Written Opinion of the International Searching Authority, or the Declaration," dated Jan. 28, 2005, 9 pages.

(Continued)

*Primary Examiner*—Frantz B Jean

(57) ABSTRACT

A smart card enabled mobile personal computing environment system stores a user's personalized, fully functional, computing environment in a smart card. The user to specifies information required to configure the client to the user's preferred personal computing environment. The user's personal computing environment data is also used for interfacing with the user's Web browser. As the user browses the Web, the Web pages are analyzed to determine if the Web page is a logon or registration form. If the form is a registration form, the system fills in the form using the user's information from the user's personal computing environment data. If the form is a logon form, the system either captures the user's user name and password if the system has not recorded them, or inserts the user name and password in the form if the information for the Web page is in the user's personal computing environment data.

18 Claims, 10 Drawing Sheets

U.S. PATENT DOCUMENTS

| | | | |
|---|---|---|---|
| 6,044,382 A * | 3/2000 | Martino | 715/505 |
| 6,055,512 A | 4/2000 | Dean et al. | |
| 6,141,752 A | 10/2000 | Dancs et al. | |
| 6,161,176 A | 12/2000 | Hunter et al. | |
| 6,170,064 B1 | 1/2001 | Lee | |
| 6,182,212 B1 | 1/2001 | Atkins et al. | |
| 6,199,114 B1 | 3/2001 | White et al. | |
| 6,260,111 B1 | 7/2001 | Craig et al. | |
| 6,292,827 B1 | 9/2001 | Raz | |
| 6,353,448 B1 * | 3/2002 | Scarborough et al. | 714/744 |
| 6,370,646 B1 | 4/2002 | Goodman et al. | |
| 6,438,550 B1 | 8/2002 | Doyle et al. | |
| 6,490,601 B1 * | 12/2002 | Markus et al. | 715/507 |
| 6,539,479 B1 | 3/2003 | Wu et al. | |
| 6,581,162 B1 | 6/2003 | Angelo et al. | |
| 6,611,914 B1 | 8/2003 | Lee | |
| 6,618,810 B1 | 9/2003 | Dirie | |
| 6,678,824 B1 | 1/2004 | Cannon | |
| 6,711,687 B1 | 3/2004 | Sekiguchi | |
| 6,738,901 B1 | 5/2004 | Boyles et al. | |
| 6,751,671 B1 | 6/2004 | Urien | |
| 6,944,650 B1 * | 9/2005 | Urien | 709/217 |
| 7,047,558 B1 | 5/2006 | Mariana | |
| 7,111,321 B1 | 9/2006 | Watts et al. | |
| 2002/0004783 A1 | 1/2002 | Paltenghe et al. | |
| 2002/0029254 A1 | 3/2002 | Davis et al. | |
| 2002/0174235 A1 | 11/2002 | Likourezos | |
| 2003/0001016 A1 | 1/2003 | Fraier et al. | |
| 2003/0196085 A1 | 10/2003 | Lampson et al. | |
| 2004/0230536 A1 * | 11/2004 | Fung et al. | 705/64 |

FOREIGN PATENT DOCUMENTS

| | | |
|---|---|---|
| WO | WO 97/29416 | 8/1997 |
| WO | WO 98/26344 A2 | 6/1998 |

OTHER PUBLICATIONS

Current claims of patent application No. PCT/US04/13663, 3 pages.
Office Action from China for foreign patent application No. 01808581.4 dated Jun. 11, 2004.
Current claims in China patent application No. 018085814.
Office Action from China for foreign patent application No. 01808581.4 dated Dec. 3, 2004.
Current claims in China patent application No. 018085814.
PCT International Preliminary Report, International Application No. PCT/US2004/013663 dated Nov. 4, 2005 containing PCT Written Opinion of ISA (4 pgs).
European Patent Office, "Communication Pursuant to Article 96(2) EPC," App. No. 01913245.5 dated Jan. 18, 2006, 5 pages.
Current Claims, EP App. No. 01913245.5, 4 pages.
Office Action from Taiwan for foreign patent application No. 91124119 dated May 15, 2006 (4 pgs).
Current claims in Taiwan patent application No. 91124119 (9 pgs).
Office Action from EPO for foreign patent application No. 01 913 245.5-2201 dated Sep. 27, 2007 (4 pgs).
Current Claims in EPO OA patent application No. 01 913 245.5-2201.

* cited by examiner

PERSONAL COMPUTING ENVIRONMENT USING MOZILLA

CROSS REFERENCE TO RELATED APPLICATIONS

This claims priority to Provisional U.S. Patent 29 No. 60/466,611, filed Apr. 30, 2003, the entire contents of which are incorporated herein by this reference, and is a Continuation In Part of U.S. patent application Ser. No. 09/796,847, filed on Feb. 28, 2001, the entire contents of which are incorporated herein by this reference, and which claims benefit of U.S. Provisional Patent Applications Ser. No. 60/185,276, filed on Feb. 28, 2000 and Ser. No. 60/185,278, filed on Feb. 28, 2000.

BACKGROUND

The current computing environment requires users, in general, to physically carry either a laptop or a notebook portable computer in order to maintain a fully functional, truly personalized, computing environment when moving from place to place. Because laptop and notebook computers, though physically small, are comparatively bulky and heavy, mobile computer users continuously seek ever smaller and lighter devices that will provide and maintain their personalized computing environment.

An example of such a smaller and lighter device that has recently enjoyed significant commercial popularity is the personal digital assistant ("PDA"). However, even though PDAs are smaller and lighter than laptop or notebook computers and provide a personalized computing environment, they do not presently offer the full functionality of desktop, laptop or notebook portable computers.

For example, when a PDA is removed from an environment in which a computer user has a fully functional computing environment, the PDA must first be loaded with an up-to-date image of data for pertinent portions of that environment, e.g., an address book, calendar, email, etc. Similarly, when a PDA returns to the fully functional computing environment, data in the PDA that has changed since leaving the fully functional computing environment must be transferred and/or synchronized from the PDA back into the user's regular computer and vice versa.

Desktop computers capable of accessing the Internet are ubiquitous in industrialized countries worldwide. A computer user, while traveling, can usually obtain access to such a computer and use that computer's Internet access to communicate worldwide. With sufficient data and appropriately configured, such computers could, in principle, provide mobile computer users with a fully functional personal computing environment. However, establishing a mobile computer user's fully functional computing environment at a remote or transitory location, e.g., in an airport kiosk or overnight lodging, requires error-free entry of a prodigious amount of highly detailed information to configure the local computer.

The amount of information required to configure a local computer so it provides the mobile computer user's fully functional, personal computing environment is disproportionately large in comparison with the benefit obtained. Consequently, there presently does not exist any convenient hardware and software that permits mobile computer users to move from computer to computer anywhere in the world, carrying with them their personalized, fully functional computing environment.

Presently, smart cards are used primarily for facilitating financial transactions. However, because smart cards include at least a limited amount of non-volatile readable and writeable memory and may also include a programmable processor, they inherently possess a capability for use in applications other than financial transactions. Storing data into a smart card, accessing that data, and activating a smart card's processor to execute a computer program all require that the smart card be interconnected with some type of reader/terminal. This characteristic of smart cards limits the potential for broadening their use for mobile computing applications because, in general, there does not presently exist an infrastructure that supports the use of smart cards for applications other than financial transactions.

It would be advantageous to provide a personal computing environment using Mozilla that allows a user to store and transport his personal computing environment in a smart card and to use the smart card to configure the computing environment of a computer. It would further be advantageous to provide a personal computing environment using Mozilla that automatically interfaces with the user's browser to fill in logon and registration forms using the user's personal computing environment data on a smart card.

SUMMARY

The invention provides a personal computing environment using Mozilla. The system allows a user to store, transport, and configure his personal computing environment via a smart card. In addition, the invention automatically interfaces with the user's browser to fill in logon and registration forms using the user's personal computing environment data on a smart card.

An embodiment of the invention stores a user's personalized, fully functional, computing environment in a smart card. A user information database is provided that is resident on a server and contains the user records of a plurality of users. Each of the user records contains personal computing environment data. The amount of data in the user record is generally larger than the storage capacity of a smart card.

An embodiment allows the user to specify the information required to configure the client to the user's preferred personal computing environment. If the correct personal computing environment data is not resident in the smart card, the client queries the server for the information needed and updates the smart card with the new data. If the smart card memory is filled, then the client will remove old indices from the smart card in a least-recently used method until there is enough room to add the new data.

The user's personal computing environment data is also used for interfacing with the user's Web browser. As the user browses the Web, the Web pages are analyzed to determine if the Web page is a logon or registration form. If the form is a registration form, the system fills in the form using the user's information from the user's personal computing environment data. If the form is a logon form, the system either captures the user's user name and password if the system has not recorded them, or inserts the user name and password in the form if the system finds the user name and password for the Web page in the user's personal computing environment data.

The user can also manage his personal computing environment data stored on the smart card and the user information database. The user is allowed to increase the size of his user records to store more information and to create sets of personal computing environment data.

The server gives the client access to the user's records through a secure Web site. The user accesses his data, adds, modifies, and/or deletes information and transfers data to his smart card via the secure Web site.

A plurality of servers with redundant copies of the user information database is used in case of any server failures. One of the servers is designated the main local server of the user based on the user's usage patterns. The client performs load balancing among the servers when obtaining data and will automatically switch to another server if the main server fails or is otherwise inaccessible.

Other aspects and advantages of the invention will become apparent from the following detailed description in combination with the accompanying drawings, illustrating, by way of example, the principles of the invention.

DETAILED DESCRIPTION

The invention is embodied in a personal computing environment using Mozilla. A system according to the invention allows a user to store, transport, and configure his personal computing environment via a smart card. In addition, the invention automatically interfaces with the user's browser to fill in logon and registration forms using the user's personal computing environment data on a smart card.

The invention provides a mobile computer user with a system that is extremely compact, and yet permits the user to carry with him sufficient machine-readable data to easily establish his fully functional mobile personal computing environment anywhere in the world.

One of the difficulties encountered when dealing with Mozilla-based browsers is how the components perform data transactions with external programs. Another difficulty is how to control the browser's events. An embodiment of the invention resolves theses two difficulties and combines the solutions to provide a method for third parties that develop external programs to control Mozilla-based browsers.

An embodiment of the invention stores, in a smart card, sufficient information to permit characterizing a mobile computer user's personalized, fully functional computing environment. The information that the mobile personal computing environment supplies may differ from system to system. However, the amount of information stored in the smart card is sufficient to create a consistent computing environment for the user. Information such as operating system preferences, favorite Web sites, email addresses, credit card information, ISP information, program preferences, program environments, etc. are stored in the smart card.

Figure 1:
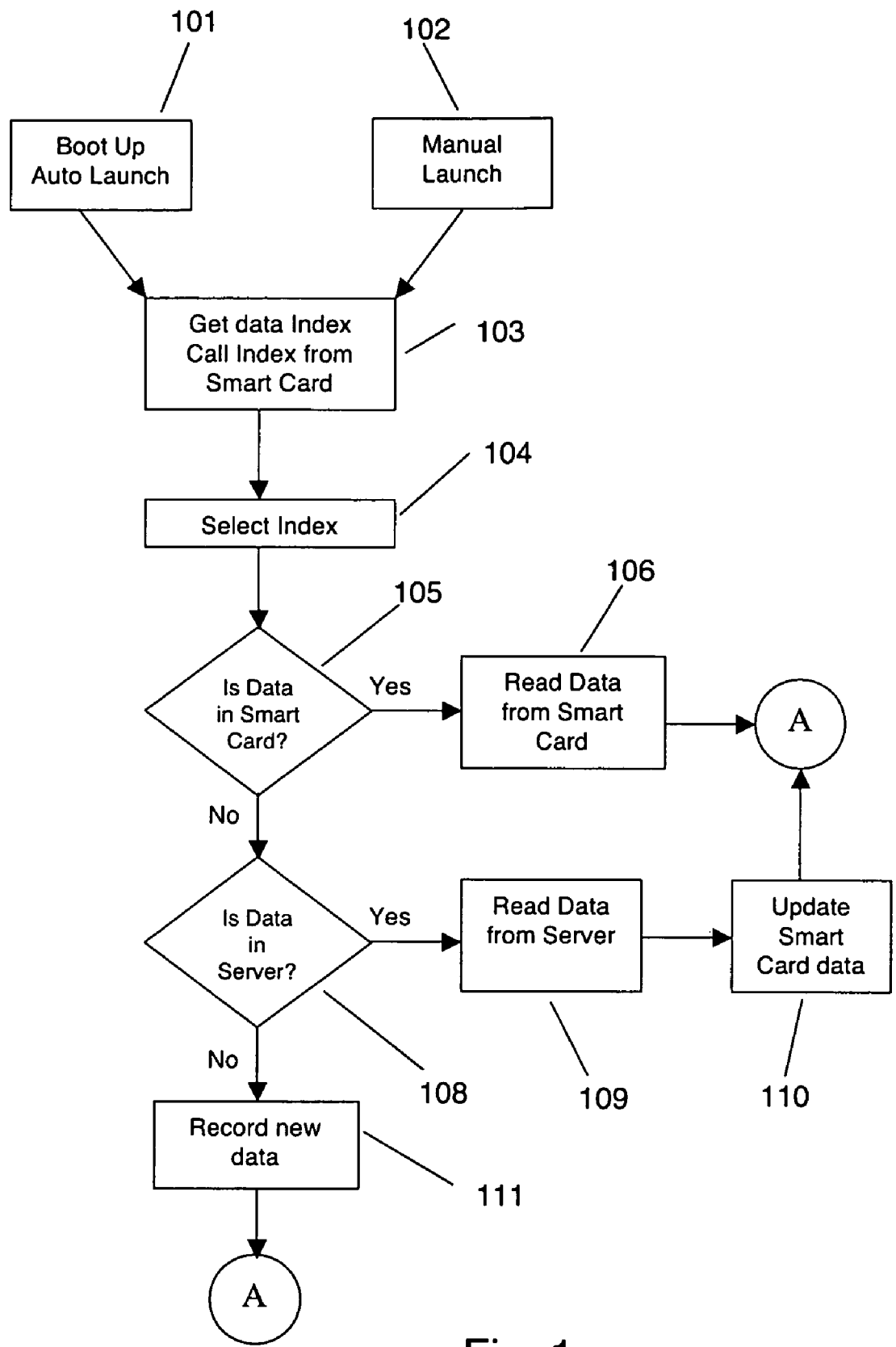
FIG. 1 is a flowchart showing the execution flow of the client to server exchange when the user specifies the indices required for his personal computing environment according to the invention.

Referring to FIG. 1, the user activates the invention's client computer program through an auto launch at boot-up 101 or through a manual launch 102 when he begins to use a client computer. A smart card reader/terminal is connected to, or resident in, the user's computer, reading the user's smart card. The client computer program retrieves indices from the smart card 103. The user specifies to the invention the data needed to establish at least a portion of his mobile personal environment through the invention's user interface 104.

The invention checks the smart card to determine if the specified data is present in the smart card's local memory 105. If the specified data is in the smart card's memory, then the invention retrieves the data from the smart card for subsequent use by the invention 106. If the specified data is not in the smart card's memory, then the invention accesses, via the Internet or other method, a secure server that stores additional data which more fully characterizes the mobile computer user's personalized, fully functional computing environment 108. The invention then retrieves the specified data from the server for subsequent use by the invention 109 and updates the smart card data 110. If the data is not on the server 108, then it is new data from the user which must be recorded and used to access the Internet 111.

Figure 2:
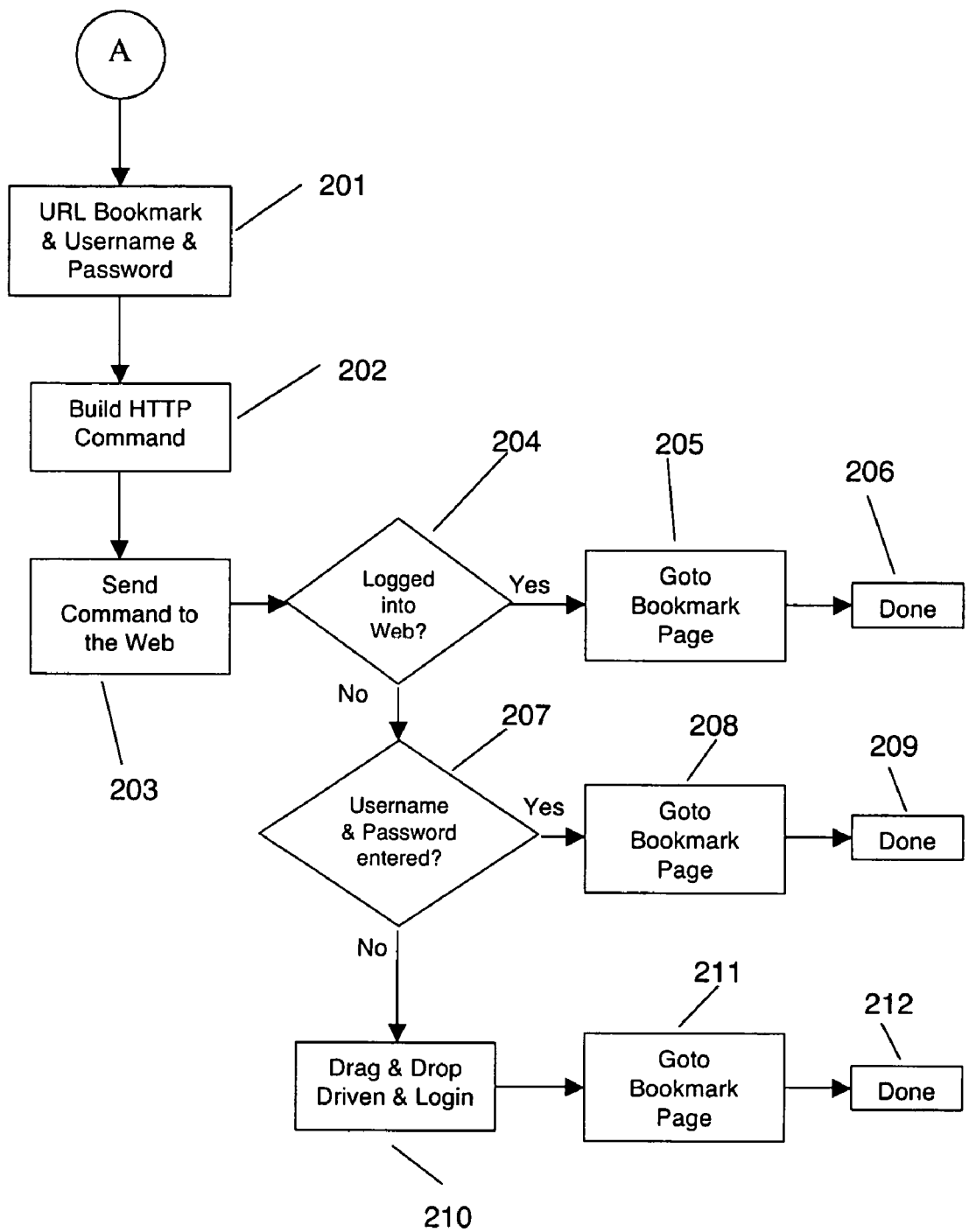
FIG. 2 is a flowchart showing the execution flow of the client to server exchange when the user specifies the indices required for his personal computing environment according to an embodiment of the invention.

With respect to FIG. 2, having retrieved the required data either from the smart card, the server, or directly from the user, the client computer program uses the data to construct a Uniform Resource Locator (URL) 201 and, if possible, gather the username, password, and Internet site bookmark data needed to immediately and directly access an Internet site that constitutes at least some part of the mobile computer user's mobile personal environment 202.

Using the data constructed in this way, the invention then builds a URL command and sends it to the Internet 203. The URL, username, password and Internet site bookmark data, if complete, permit the mobile computer user to log onto the specified Internet site 204 and proceed immediately to a specified page at that Internet site 205. If some information is incorrect or incomplete, interacting with the Internet site accessed by the URL, the mobile computer user can either enter, as required, the username, password, and Internet page data to access a desired Internet page 207, 208, or may supply that information through a graphical user interface (GUI) that provides a drag and drop capability 210, 211.

Figure 3:
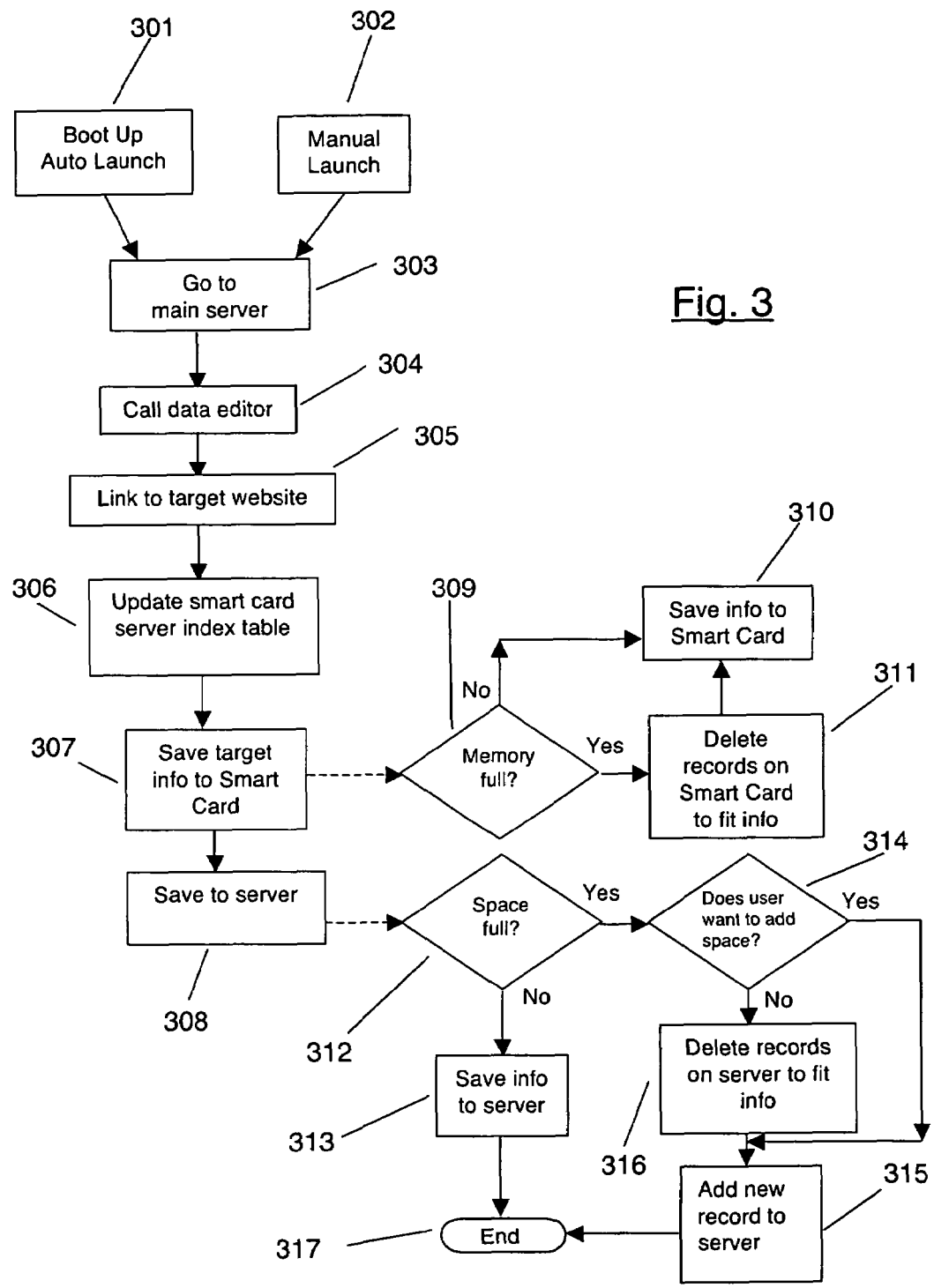
FIG. 3 is a flowchart showing the schema for managing a user's personal computing environment data between a server database and a smart card according to an embodiment of the invention.

Referring to FIG. 3, to initialize or update indices stored on the smart card, the user activates the invention's client computer program 301, 302, instructing the program to access, via the Internet or other method, the server that stores additional information which characterizes a mobile computer user's personalized, fully functional computing environment 303. The server permits the user to change data characterizing his personalized mobile personal environment 304, for example, adding a new Internet site to his environment. After the user specifies changes to be made in his mobile personal environment, the server links to the specified Internet site and determines updated indices for storage on the smart card 305.

After linking to the specified Internet site and updating the computing environment information stored at the server 306, the invention attempts to update the indices stored on the user's smart card connected to his computer 307. If the smart card memory is full 309, then one record is deleted from those stored in the smart card until the smart card has sufficient free memory to store the updated indices 311, the updated index is then written into the smart card's memory 310. Otherwise, if the smart card memory is not full 309, then the updated indices are immediately stored on the smart card 310. In addition to saving the updated indices on the smart card, the server also saves the updated index in its database which characterizes this mobile computer user's mobile personal environment 308.

If the amount of unused storage in the server's database is sufficient to store the updated indices 312, then the information is stored in the database 313. Otherwise, the server first offers the user an opportunity to allocate more server storage for his indices 314. If the user declines the offer of additional storage, then the server deletes one record from the database until the server has sufficient free memory to store the updated indices 316. The server then adds the updated index to the indices stored in the database 315. If the user accepts the offer of additional storage 314, then the new index is added to the server's database 315. The mobile computer user is able to initially specify and, as required, update data that characterizes his mobile personal environment.

The user is allowed to create sets of indices when storing a larger amount of information on the server than is available on the user's smart card. The user can then choose between different sets of information to be downloaded to his smart card. For example, the user can set his smart card to his personalized mobile computer environment for his U.S. office, foreign office, or even his home. This allows the user to characterize each separate and distinct computer system that he uses.

One skilled in the art will readily appreciate that although the mobile computer user's personalized computer environment is specifically mentioned above, any other type of information, such as personal data, financial data, operating system, computer personality, video and/or audio data, etc., are easily substituted in its place.

Figure 4:
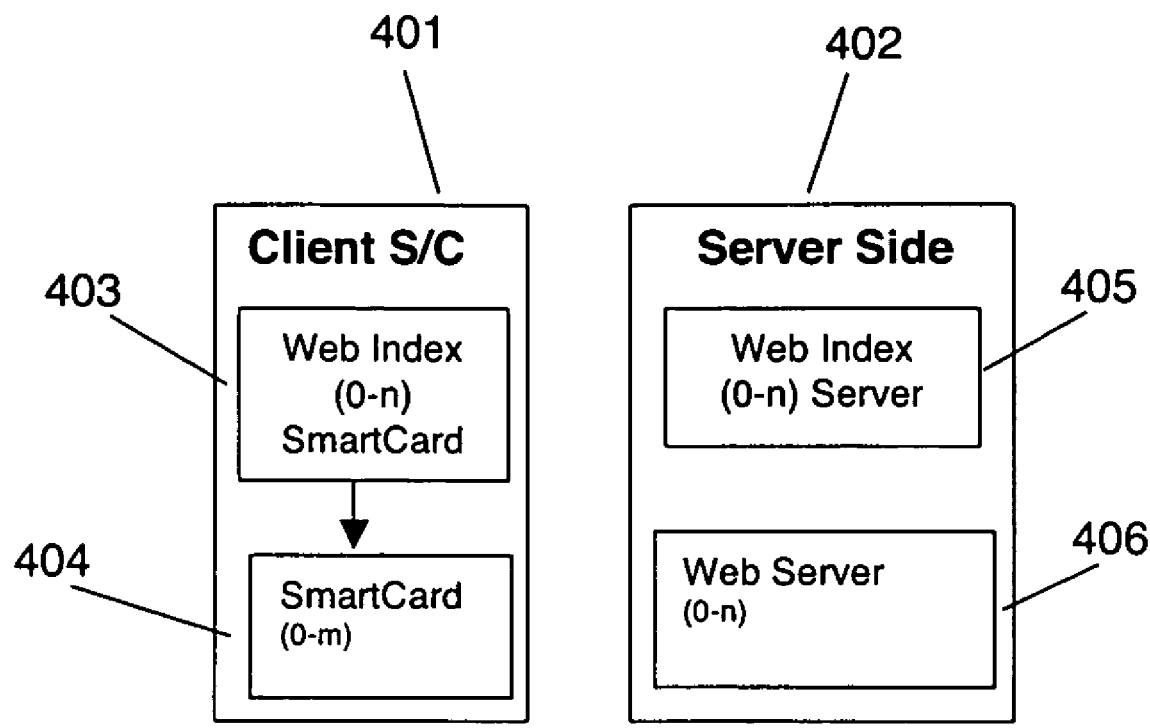
FIG. 4 is a block schematic diagram showing the user's indices accessible on a client and a server according to an embodiment of the invention.

With respect to FIG. 4, the invention provides an infrastructure that permits using smart cards for applications other than financial transactions. The smart card 404 is interconnected with a smart card reader/terminal that can communicate via the Internet, extranet, or intranet 402. Using this device 401, a computer user specifies characteristics for some computing function. Presuming that the reader/terminal is connected to the user's personal computer, an index for the specified computing function is stored into that computer's memory 403. Also, the index is stored both into the smart card 404 and into a server accessible via the Internet, extranet, or intranet 402, 405, 406.

Figure 5:
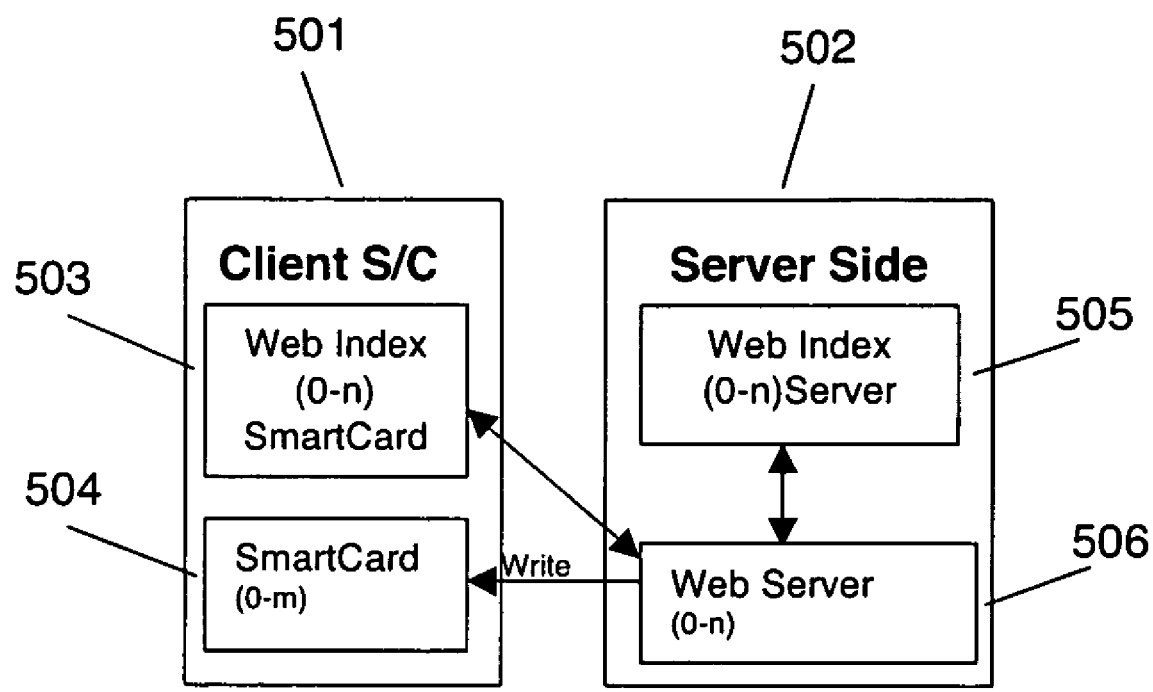
FIG. 5 is a block schematic diagram showing the exchange of the user's indices between a client and a server according to an embodiment of the invention.

Referring to FIG. 5, in general, the smart card stores only a fraction of a computer user's total indices since smart cards possess only a limited amount of memory. When those indices completely fill the available smart card memory 504, addition of another index causes the least recently used index to be deleted from the smart card's memory 504. However, because the server may, in principle, store more indices 505 than the smart card 504, the index discarded from the smart card 504 can remain stored and accessible at the server 502, 506. In this way, the smart card 504 carries indices that characterize at least some fraction of computing functions specified by individual computer users 503, 505, thereby making those functions accessible to the computer user worldwide 506 at any suitably programmed smart card reader/terminal.

Figure 6:
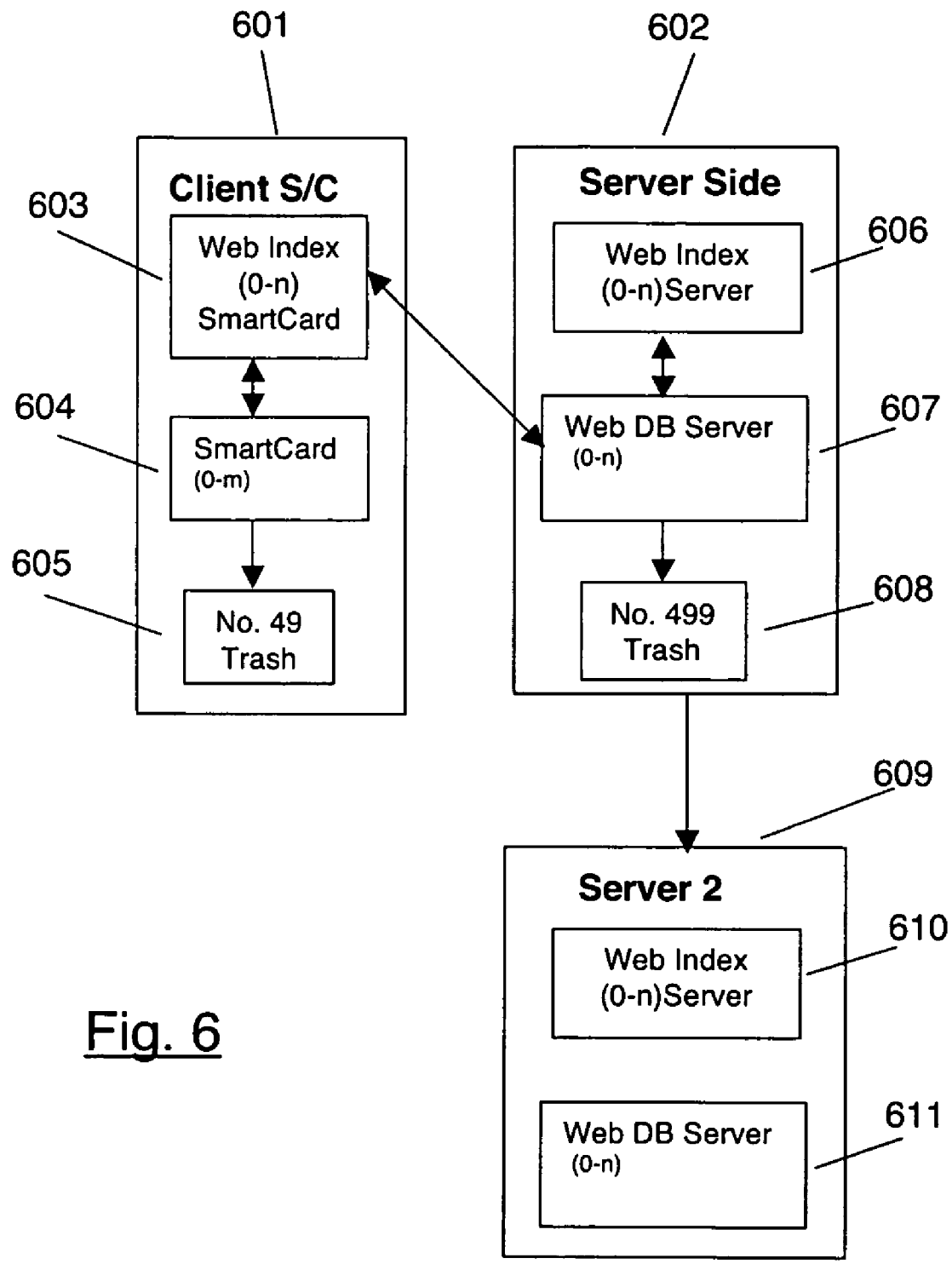
FIG. 6 is a block schematic diagram showing the exchange of data between the user's smart card, a client, a server, and a redundant server when a user index is deleted according to an embodiment of the invention.

With respect to FIG. 6, in accessing a pre-specified computer function, the smart card 604 is placed in a suitably programmed reader/terminal 601 from which the index stored in the smart card 604 is transferred to that reader/terminal or host computer device's memory 603. If the requested index is not present in the smart card's memory 604, the device 601 then accesses the server 602 via the Internet, extranet, or intranet 607 to retrieve the index that is stored there 606. Because retrieving a particular index from the server 602 makes it the most recently used index, the device 601 transfers the index both to the device's memory 603 and replaces the least recently used index 605 in the smart card's memory 604 with the most recently used index. If a new index is added to the server database 606 when the database 606 is full, the system either discards the least recently used index 608 or, if possible, gives the user the option to allocate more server storage for his records, as described above.

Another preferred embodiment of the invention adds a backup server 609 that contains a consistent copy of the entire user database 606 served by the main server 602. If the main server 602 fails, the backup server 609 takes over. The backup server's database 610 and external interface 611 are identical to the main server's 602 components.

Additionally, a plurality of servers can be used along with load balancing, to handle large amounts of client requests. The client can perform its own load balancing among the servers by using, for example, the response time (RTT) from each server to determine the best choice. If the main server serving the user fails or is otherwise inaccessible, then the client will automatically switch to another server.

Figure 7:
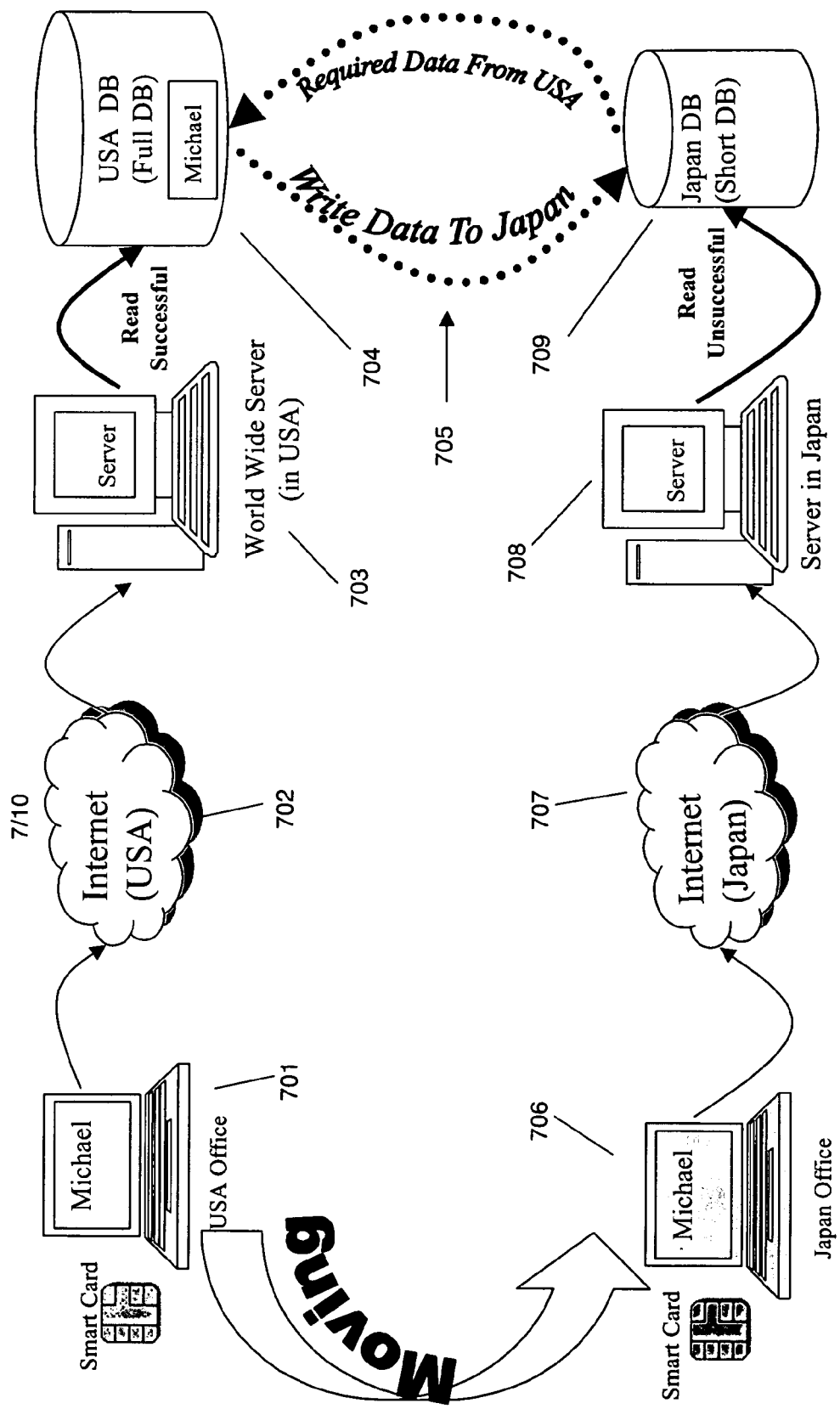
FIG. 7 is a block schematic diagram depicting a scenario when the server responsible for a particular user is switched when the user relocates according to an embodiment of the invention.

Referring to FIG. 7, to efficiently utilize server resources distributed at various locations throughout the world, the invention records places in the world from which a user accesses his mobile personal environment. Recording such data permits the server to reasonably determine that a user has moved from one place to another, e.g., from the United States to Japan. For example, if a user who had previously accessed his mobile personal environment 704 mostly from the United States 701, 702, 703 suddenly began accessing that environment 704, 709 entirely from Japan 706, 707, 708 for an extended interval of time, e.g., one or two months, then the server 704 can reasonably determine that the user has moved from the United States to Japan. If the server 704 determines that the user has relocated his residence and if there exists another server 709 that is located physically closer to the user's new residence, then the systems operating on both servers 704, 709 effect a transfer of the user's mobile personal environment indices 705 from the more remote server 704 to the nearer server 709.

The invention allows mobile computer users to carry, on a single smart card, all the information required to characterize their mobile personal environment and to quickly establish their mobile personal environment anywhere in the world.

Figure 8:
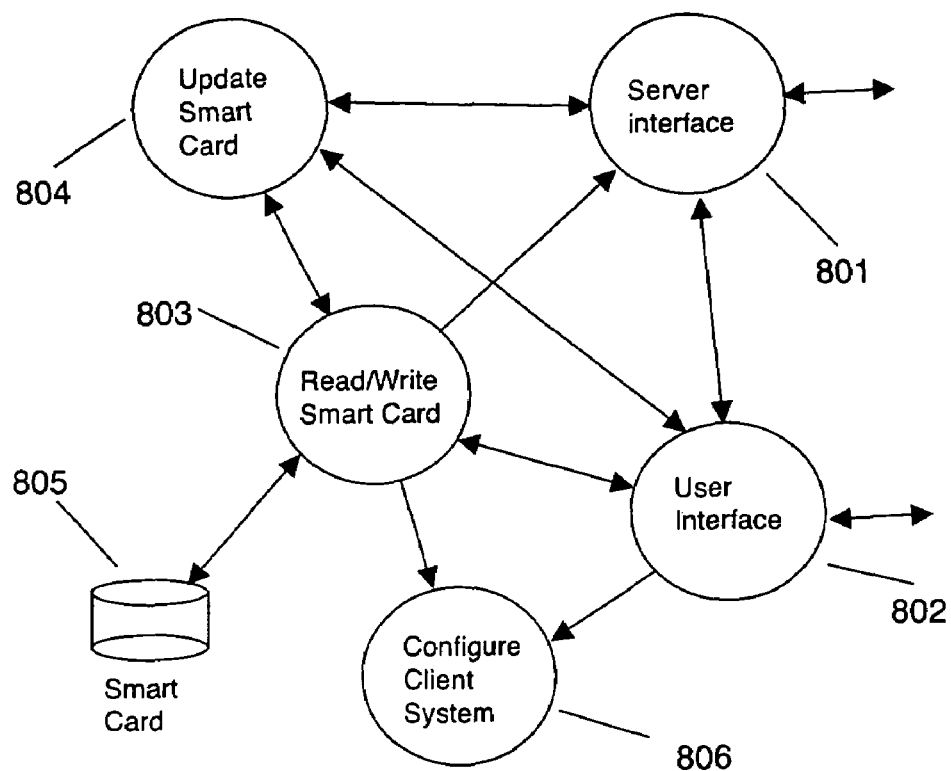
FIG. 8 is a block schematic diagram of a task-oriented viewpoint of a preferred embodiment of the invention illustrating the client and server tasks for a server-based data management system according to an embodiment of the invention.
Figure 8:
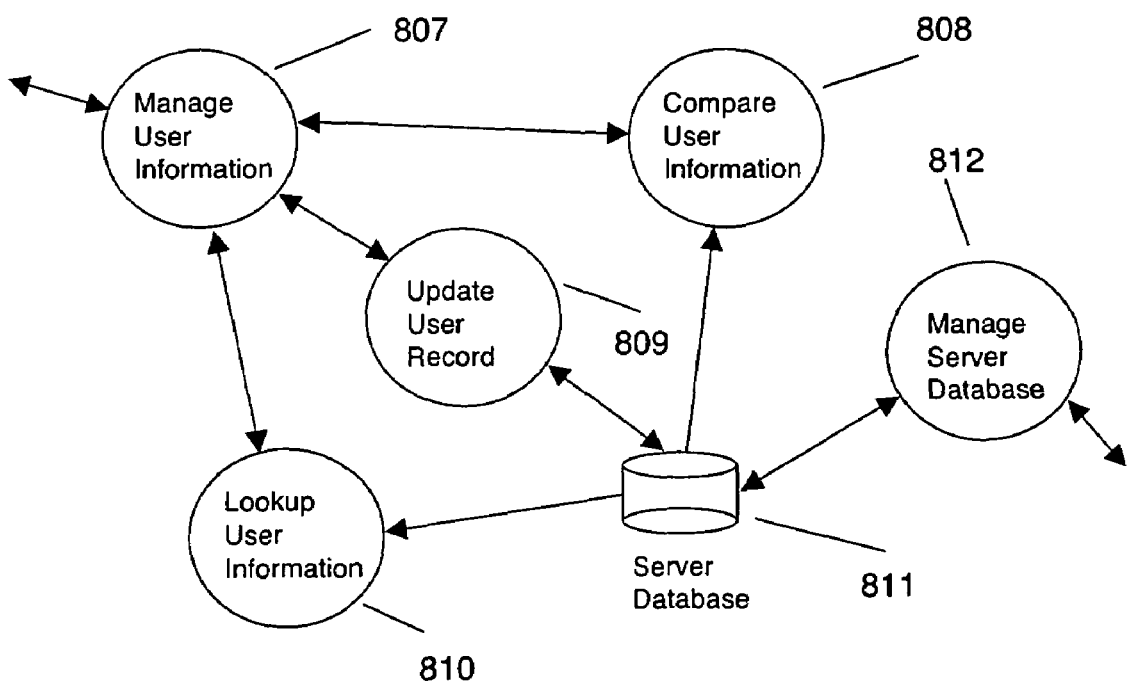

With respect to FIG. 8, a high-level task viewpoint of a preferred embodiment of the invention is shown. The user plugs his Smart Card 805 into the smart card reader that is connected to, or resident in, the client computer. The Configure Client System module 806 reads the Smart Card 805 through the Read/Write Smart Card module 803. The Configure Client System module 806 either automatically configures the client computer to the user's personal computing environment or queries the user through the User Interface 802 for the information needed from the Smart Card 805 to configure the user's personal computing environment (as described above), depending on the user's preference settings.

The user can also manage the indices stored on his Smart Card 805 and the Server Database 811. The Server Interface module 801 communicates with the secure server containing the user's information. The communication is through the secure Web site provided by the Manage User Information module 807 on the server. The Manage User Information module 807 displays the user's indices stored on the Server Database 811. The user requests his indices through the secure Web site. His indices are retrieved from the Server Database 811 by the Lookup User Information module 810. The Lookup User Information module 810 relays the index information to the Manage User Information module 807. The indices resident on the user's Smart Card 805 are sent to the Manage User Information module 807 through the Server Interface 801. The smart card indices are compared with the user's indices from the Server Database 811 by the Compare User Information module 808, which correlates and compares any differences between the two sources. The Manage User Information module 807 displays the information to the user through a secure Web page.

The user can create (for new users), add, delete, and update his indices through the User Interface module 802 connection to the secure Web page. The Server Database 811 indices are updated through the Update User Record module 809. Smart Card indices are updated by the Manage User Information module 807 through the Server Interface 801. The Server Interface 801 sends the update information to the Update Smart Card module 804. The Update Smart Card module 804 writes the information to the Smart Card 805 through the Read/Write Smart Card Module 803.

In the case of multiple servers, the Server Database 811 is redundantly stored among other servers. The Server Database 811 is updated with information from other servers by the Manage Server Database module 812. Any new updates to the Server Database 811 that are initiated locally are sent out to other servers by the Manage Server Database module 812.

Additionally, any transfers of user index records from one server to a more local server (in case of the user relocating to another location) is performed by the Manage Server Database module 812.

Figure 9:
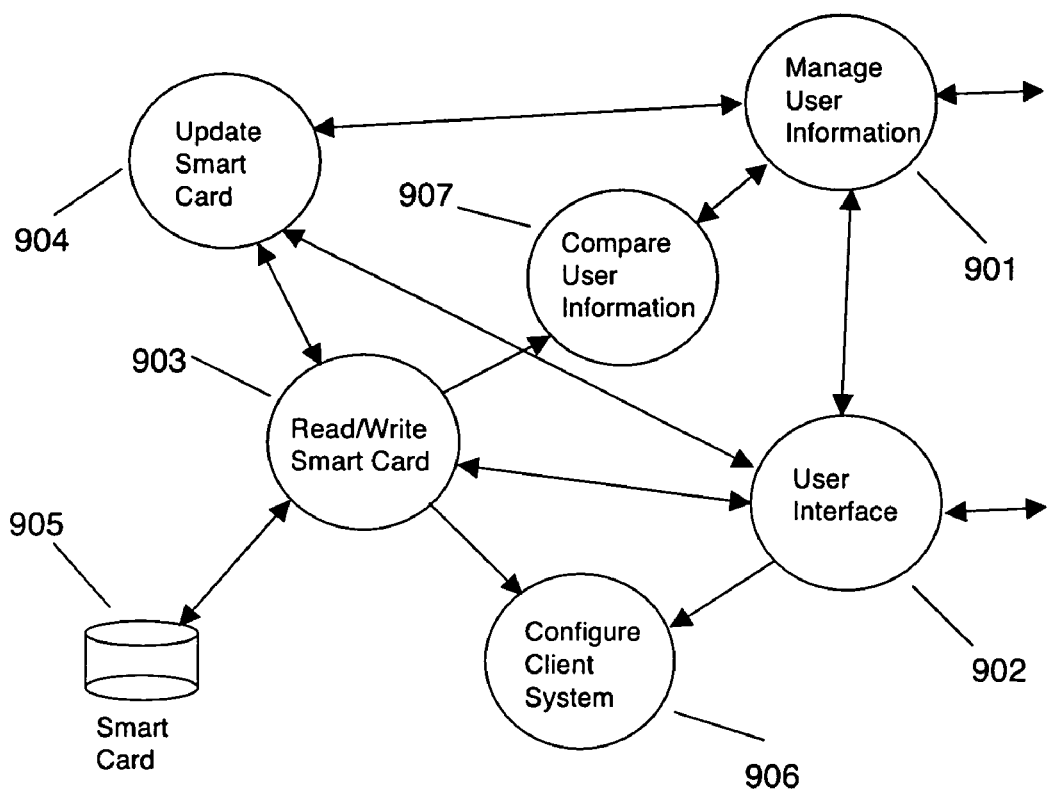
FIG. 9 is a block schematic diagram of a task-oriented viewpoint of a preferred embodiment of the invention illustrating the client and server tasks for a client-based data management system according to an embodiment of the invention.
Figure 9:
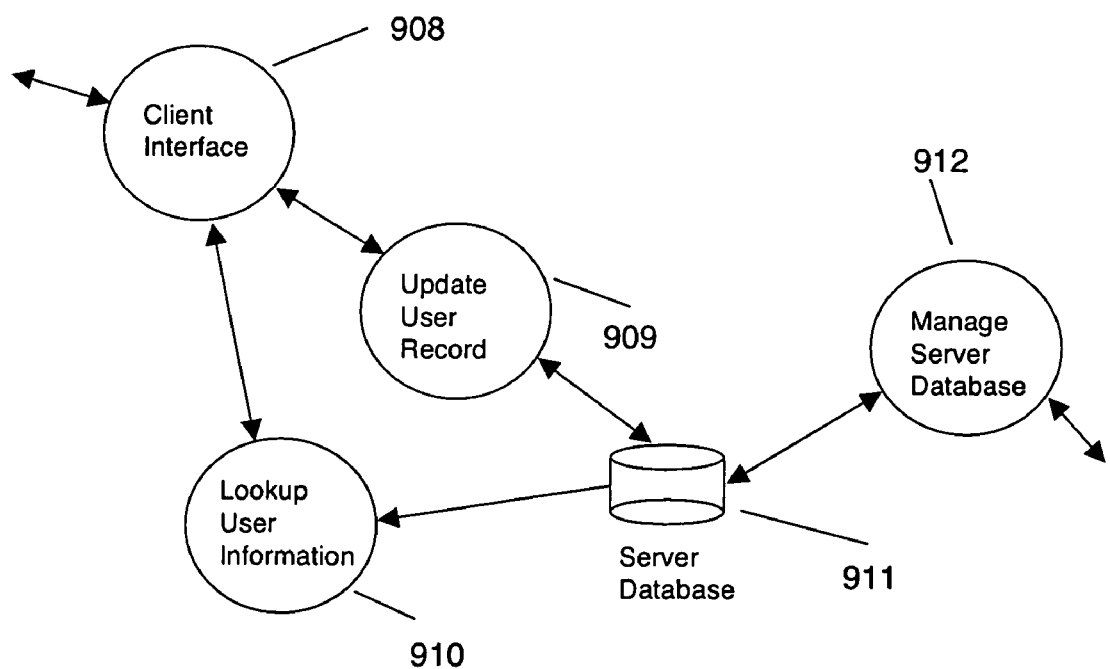

Referring to FIG. 9, another preferred embodiment of the invention is shown that performs that same basic functions as those described in FIG. 8, except that the client has a server connection that is most likely temporary in nature, e.g., a dialup modem connection. The difference in operation between FIGS. 8 and 9 is when the user manages his indices on his smart card and server database. The client connects to the Client Interface module 908 on the server through the Manage User Information module 901, resident on the client. The Client Interface 908 collects the user's indices for the Manage User Information module 901. The user's records are retrieved from the Server Database 911 by the Lookup User Information module 910.

Once the user's indices are received by the Manage User Information module 901, the client can disconnect from the server and the user manages his indices offline with the client. The Compare User Information module 907 operates in the same manner as described above. The information obtained from the Server Database 911 and the Smart Card 905 are displayed to the user through the User Interface 902. After the user has updated his indices and any changes to the user's records on the Server Database 911 are required, the client reconnects with the server's Client Interface 908. The Server Database 911 is updated with any changes by the Update User Record module 909.

Yet another preferred embodiment of the invention encrypts the entire Server Database 911. Each user record is individually encrypted such that if one user record is accessed and decrypted by a hacker, the other user records will not be compromised in any way. The actual encryption of a user record is performed by the client. The Manage User Information module 901 retrieves the user's encrypted record from the server. If this fails, then the user must create a new record to access. The server looks up, using the Smart Card's 905 ID, and retrieves the user's record through the Lookup User Information module 910. The server does not know what the contents of the record are, only that the record belongs to the user (much like a safety deposit box). The record is sent back to the client via the Client Interface module 908.

The Manage User Information module 901 decrypts the user record using the Smart Card 905 encryption key information stored in the Smart Card 905. Each smart card is unique and the encryption key only exists on a particular smart card and not on the server. Once the user has completed any changes to the indices in the record, the Manage User Information module 901 encrypts the user record using the encryption key on the Smart Card 905 and sends the record back to the server. The Client Interface module 908 sends the encrypted record to the Update User Record module 909 which replaces the user record in the Server Database 911 with the new encrypted user record.

This approach ensures that there is a one-to-one mapping of user records to smart cards; each user record in the Server Database 911 can only be decrypted by a specific smart card. It also ensures that the Server Database 911 is secure and cannot be easily compromised. The intruder would have to physically have every existing smart card to crack the entire database.

If a user loses his smart card, then there is a procedure where the smart card can be morphed, or recreated. The user inserts a new Smart Card 905 into the client system. The system through the User Interface module 902 has the user enter in his personal information in the same manner as when he first created his original smart card. The new Smart Card 905 is then initialized and the encryption key is recreated. The new smart card's ID is sent to the Client Interface module 908 from the User Interface module 902 via the Manage User Information module 901. The Update User Record module 909 removes the original smart card's ID from the user's record on the Server Database 911 and replaces it with the new smart card's ID. Once that is completed, the User Interface module 902 then places the encryption key in the new Smart Card 905 via the Read/Write Smart Card module 903. The user's smart card has now been recreated and the original smart card disabled.

The server has the ability to simultaneously perform the server functions described in FIGS. 8 and 9. This allows the server to handle both secure Web access and clients that have temporary server connections.

One skilled in the art will readily appreciate that although the client and server functionality are described separately above, both the client and server can reside on the same physical machine.

Mozilla Interface

An embodiment of the invention supports Mozilla Web Engine based Browsers, such as Netscape 6.XX and above, Mozilla, Compuserve, and other browsers.

The embodiment adds security protection to Web browsing. The user inserts his smart card into a connected smart card reader. The invention follows the user through his Web browsing sessions and looks for forms, such as log in, registration, and ecommerce forms, that need to be filled in with the user's personal information. The user's personal information is stored in the user's smart card.

The forms are analyzed by the system to identify the type of form displayed and the information needed to fill the form.

The system uses the information on the user's smart card to perform logins and form filling. This allows the user to switch between computers without having to worry about remembering or typing in personal information. The user is also assured that his personal information is always with him whenever he carries his smart card (or smart credit card, etc.).

The system changes Mozilla's original depressed file, "comm.jar". This file consists of many script files. Script files are added into the Mozilla file and some of the existing script files are modified. The additions and modifications allow the system to control Mozilla's events. For example, "navigator.xul" is modified so when Mozilla is loaded, it will run the system's program and load the system's component (nsPlatiMozui). The files "Navigator.js", "contentAreaClick.js", "browser.js" and others are modified so the system can control the events and set the data that it wants.

A component is added to the Mozilla engine. The component is named "nsPlatiMozui" and it is an XPCOM (Cross Platform COM) object. The component uses an XPIDL interface and provides some attributes and functions that Mozilla will use. After the component is registered into Mozilla's registry by using regxpcom.exe it can used by Mozilla. When Mozilla is loaded during runtime, Mozilla will also load the component (nsPlatiMozUi.dll).

Figure 10:
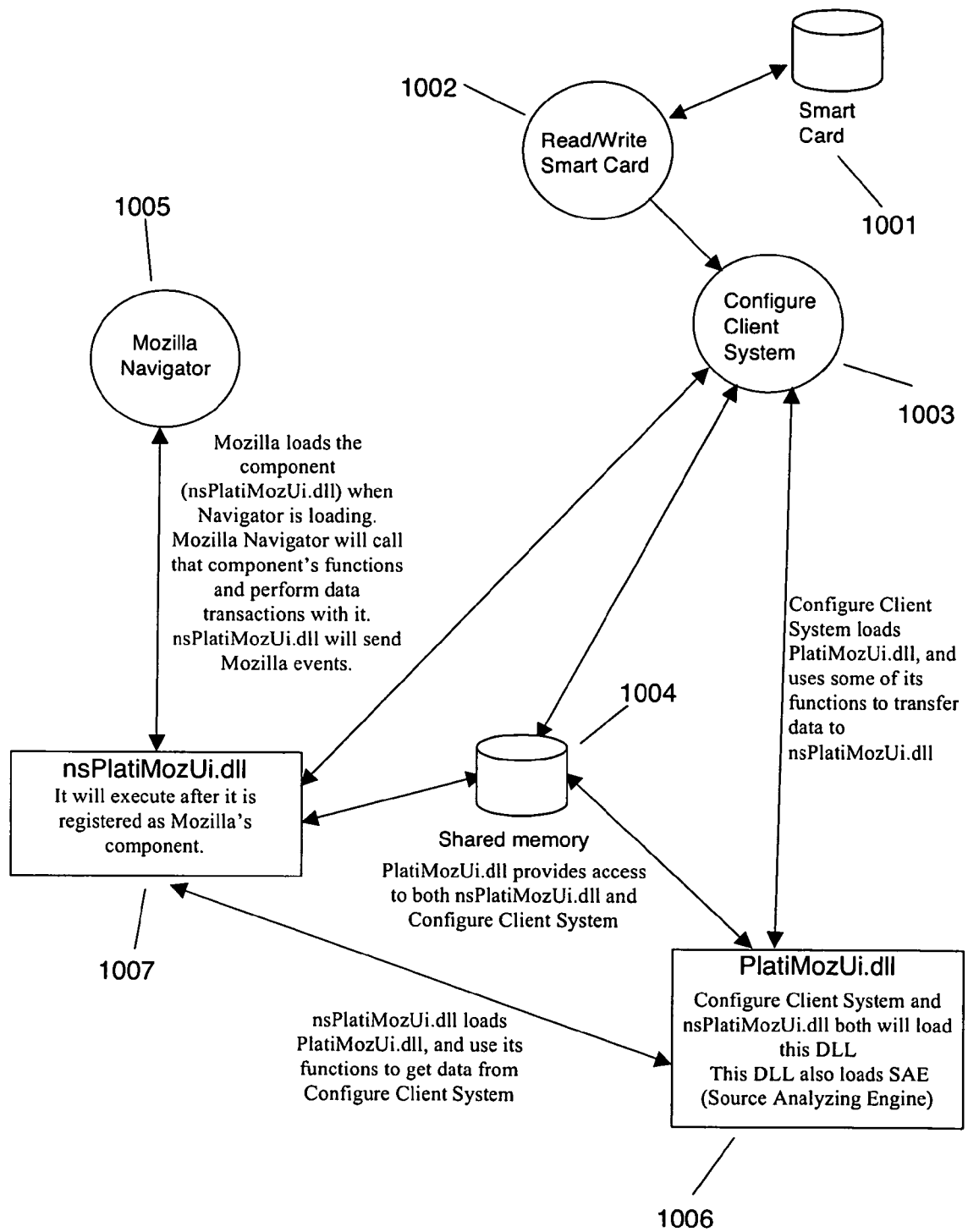
FIG. 10 is a block schematic diagram of a task-oriented viewpoint of a preferred embodiment of the invention illustrating the configuration module interfacing with Mozilla according to an embodiment of the invention.

Referring to FIG. 10, the task level interaction between the system and Mozilla is shown. The nsPlatiMozui component 1007 is designed to communicate with a Mozilla based browser 1005 and the configure client module 1003. Mozilla allows third parties to add some components internally to expand Mozilla's features. However, the component works as a part of Mozilla, therefore it is difficult to perform data transactions with external programs.

The nsPlatiMozui component 1007 resolves this problem. The nsPlatiMozui component 1007 loads another DLL that provides a shared memory component. The configure client module 1003 also loads this DLL, so the configure client module 1003 can use the shared memory to perform data transactions with the nsPlatiMozui component. The nsPlatiMozui component uses a hidden window to interact with the configure client module 1003 and Mozilla 1005.

The nsPlatiMozUi component 1007 is an XPCOM (cross platform com) component. Its dynamic link library is named "nsPlatiMozUi.dll". After the nsPlatiMozUi component 1007 is registered by using regxpcom.exe, it is then available for use by the Mozilla browsers.

The nsPlatiMozUi component 1007 also loads another dynamic link library named "PlatiMozUi.dll" component 1006. This DLL provides a shared memory that the configure client module 1003, nsPlatiMozUi.dll, and other programs can use. The PlatiMozUi.dll 1006 also loads the Source Analyzing Engine ("PlatiAnaSrc.dll") to analyze the Mozilla browser's 1005 Web page's HTML source code.

Once the configure client module 1003 is loaded, the configure client module 1003 will use the PlatiMozUi.dll's 1006 functions to set its window handle in the shared memory.

When the Netscape 6.XX or upper version browser 1005 is loaded, the script files in "comm.jar" will execute to load the nsPlatiMozui component 1007. The nsPlatiMozui component 1007 loads PlatiMozUi.dll 1006.

As the browser 1005 completes a user's navigation, the script files in "comm.jar" will check if there is a form in the Web page and what kind of form it is.

If the form is a logon form or Registration form, the nsPlatiMozui component 1007 uses the PlatiMozUi.dll's 1006 functions to the check the configure client module's handle in the shared memory. If the configure client module 1003 is not loaded, the nsPlatiMozui component 1007 will do nothing, otherwise, the nsPlatiMozui component 1007 launches a hidden window.

The hidden window sends the configure client module's window informational messages. The message is different depending on what type (format) of form the form is, e.g., a logon or registration form. The configure client module 1003 acts when it receives the message, either to check if the configure client module 1003 has already recorded the account information for the Web site or to send the user's information back to the nsPlatiMozui component 1007. The configure client module 1003 will set data in the shared memory indicating the user's information and status via the hidden window. The hidden window places the data in the shared memory 1004 when it receives the message from the configure client module 1003.

If the form is a registration form, the nsPlatiMozui component 1007 fills in the user's information, such as the user's first name and last name, in the form that it obtains form the shared memory 1004. If the form is a logon form, the nsPlatiMozui component 1007 either captures the user's user name and password if the configure client module 1003 has not recorded them, or inserts the user name and password in the form if the configure client module 1003 has already recorded them (the nsPlatiMozui component 1007 finds the user name and password in the shared memory 1004).

If the nsPlatiMozui component 1007 captures the user's user name and password, it passes the information to the configure client module 1003 via the shared memory 1004 by sending a message to the configure client module's window. The configure client module 1003 passes the user's user name and password from the shared memory 1004 to the read/write smart card module 1002. The read/write smart card module 1002 saves the information to the smart card 1001 if the user desires.

One skilled in the art will readily appreciate that although Mozilla-based browsers are mentioned above, that other types of browsers can be similarly used to achieve the same results.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

The invention claimed is:
1. A method, comprising:
reading a user's personal computing environment data from a transportable memory device in communication with a client device;
monitoring Mozilla-based Web browser activity;

wherein the browser monitoring step determines if a Web page that the user visits is a form and determines a format of the form; and analyzing fields in the form and automatically filling in fields in the form using the user's personal computing environment data.

2. The method of claim 1, wherein the browser monitoring step uses a dynamically linked library (dll) interface to the Mozilla-based browser to communicate with the browser.

3. The method of claim 1, wherein if the form is a registration form, then the automatic filling step fills in fields in the form using the user's information from the user's personal computing environment data.

4. The method of claim 1, wherein if the form is a logon form, then the automatic filling step captures the user's user name and password if the user's user name and password for the Web page are not in the user's personal computing environment data.

5. The method of claim 1, wherein if the form is a logon form, then the automatic filling step inserts the user's user name and password in fields in the form if the user's user name and password for the Web page is in the user's personal computing environment data.

6. An apparatus, comprising:

a module for reading a user's personal computing environment data from a transportable memory device in communication with a client device;

a browser monitoring module on the client for monitoring Mozilla-based Web browser activity;

wherein the browser monitoring module determines if a Web page that the user visits is a form and determines a format of the form; and a module for analyzing fields in the form and automatically filling in fields in the form using the user's personal computing environment data.

7. The apparatus of claim 6, wherein the browser monitoring module uses a dynamically linked library (dll) interface to the Mozilla-based browser to communicate with the browser.

8. The apparatus of claim 6, wherein if the form is a registration form, then the automatic filling module fills in fields in the form using the user's information from the user's personal computing environment data.

9. The apparatus of claim 6, wherein if the form is a logon form, then the automatic filling module captures the user's user name and password if the user's user name and password for the Web page are not in the user's personal computing environment data.

10. The apparatus of claim 6, wherein if the form is a logon form, then the automatic filling module inserts the user's user name and password in fields in the form if the user's user name and password for the Web page is in the user's personal computing environment data.

11. A method, comprising:

reading a user's personal computing environment data from a transportable memory device in communication with a client device;

monitoring the user's Web browser for Web pages visited by a user on the client device;

wherein the monitoring step determines if a Web page is a form and determines a format of the form; and automatically filling in fields in the form using the user's personal computing environment data.

12. The method of claim 11, wherein if the form is a registration form, then the automatic filling step fills in fields in the form using the user's information from the user's personal computing environment data.

13. The method of claim 11, wherein if the form is a logon form, then the automatic filling step captures the user's user name and password if the user's user name and password for the Web page are not in the user's personal computing environment data.

14. The method of claim 11, wherein if the form is a logon form, then the automatic filling step inserts the user's user name and password in fields in the form if the user's user name and password for the Web page is in the user's personal computing environment data.

15. An apparatus, comprising:

a module for reading a user's personal computing environment data from a transportable memory device in communication with a client device;

a module for monitoring the user's Web browser for Web pages visited by a user on the client device;

wherein the monitoring means determines if a Web page is a form and determines the format of the form; and a module for automatically filling in fields in the form using the user's personal computing environment data.

16. The apparatus of claim 15, wherein if the form is a registration form, then the automatic filling module fills in fields in the form using the user's information from the user's personal computing environment data.

17. The apparatus of claim 15, wherein if the form is a logon form, then the automatic filling module captures the user's user name and password if the user's user name and password for the Web page are not in the user's personal computing environment data.

18. The apparatus of claim 15, wherein if the form is a logon form, then the automatic filling module inserts the user's user name and password in fields in the form if the user's user name and password for the Web page is in the user's personal computing environment data.

* * * * *